(12) United States Patent
Boocock

(10) Patent No.: US 10,000,886 B2
(45) Date of Patent: Jun. 19, 2018

(54) FASTENER FOR HANGING CLOTHES

(71) Applicant: SBI GLOBAL PTY LTD, McLaren Vale (AU)

(72) Inventor: Scott Boocock, McLaren Vale (AU)

(73) Assignee: SBI GLOBAL PTY LIMITED, McLaren Vale (AU)

( * ) Notice: Subject to any disclaimer, the term of this patent is extended or adjusted under 35 U.S.C. 154(b) by 0 days. days.

(21) Appl. No.: 14/650,599

(22) PCT Filed: Dec. 12, 2013

(86) PCT No.: PCT/AU2013/001457
§ 371 (c)(1),
(2) Date: Jun. 9, 2015

(87) PCT Pub. No.: WO2014/089628
PCT Pub. Date: Jun. 19, 2014

(65) Prior Publication Data
US 2015/0308033 A1 Oct. 29, 2015

(30) Foreign Application Priority Data
Dec. 14, 2012 (AU) ................................ 2012905497

(51) Int. Cl.
| | |
|---|---|
| *D06F 55/00* | (2006.01) |
| *F16B 2/22* | (2006.01) |
| *A47G 25/14* | (2006.01) |
| *D06F 55/02* | (2006.01) |

(52) U.S. Cl.
CPC ............ *D06F 55/00* (2013.01); *A47G 25/14* (2013.01); *D06F 55/02* (2013.01); *F16B 2/22* (2013.01); *Y10S 24/29* (2013.01); *Y10T 24/44274* (2015.01)

(58) Field of Classification Search
CPC .... A47G 25/14; A47G 25/00; Y10T 24/3449; Y10T 24/44274; D06F 55/00; D06F 55/02; Y10S 24/29
See application file for complete search history.

(56) References Cited

U.S. PATENT DOCUMENTS

| | | | | |
|---|---|---|---|---|
| 127,012 | A * | 5/1872 | Bacher ...................... | B25B 9/02 |
| | | | | 24/553 |
| 1,421,026 | A * | 6/1922 | Regan ................... | F16G 11/046 |
| | | | | 114/199 |
| 1,441,737 | A * | 1/1923 | Mickelson .............. | F16G 11/14 |
| | | | | 24/129 R |
| 1,640,497 | A * | 8/1927 | Halket et al. ........ | A47G 25/743 |
| | | | | 211/113 |

(Continued)

FOREIGN PATENT DOCUMENTS

| | | | | |
|---|---|---|---|---|
| CH | 540378 | A * | 8/1973 | ............. D06F 55/00 |
| DE | 341291 | | 9/1921 | |
| DE | 20107749 | U1 | 9/2001 | |

(Continued)

OTHER PUBLICATIONS

International Search Report for PCT/AU2013/001457 dated Feb. 10, 2014.

*Primary Examiner* — Robert Sandy
(74) *Attorney, Agent, or Firm* — Heslin Rothenberg Farley & Mesiti P.C.; Victor A. Cardona, Esq.

(57) ABSTRACT

There is provided a fastener for hanging clothes, the fastener including a lifting hook adapted for lifting in use.

16 Claims, 8 Drawing Sheets

(56) References Cited

U.S. PATENT DOCUMENTS

| | | | | |
|---|---|---|---|---|
| 1,687,520 A | * | 10/1928 | Shaffer | F04B 47/026 24/370 |
| 7,636,986 B2 | * | 12/2009 | Sorensen | B60P 7/0823 24/129 A |

FOREIGN PATENT DOCUMENTS

| | | | | |
|---|---|---|---|---|
| DE | 202004002142 U1 | 6/2004 | | |
| EP | 2468943 A1 | 6/2012 | | |
| ES | 1070718 | 10/2009 | | |
| ES | 1070718 U | 10/2009 | | |
| GB | 210016 | 1/1924 | | |
| JP | 54-041271 | 3/1979 | | |
| JP | 11-332723 | 12/1999 | | |
| JP | 11332723 | 12/1999 | | |
| JP | 2000-135399 | 11/2001 | | |
| WO | 1985001760 A1 | 4/1985 | | |
| WO | WO 9818991 A1 | * | 5/1998 | D06F 55/02 |
| WO | 2011/009988 A1 | 1/2011 | | |

\* cited by examiner

FASTENER FOR HANGING CLOTHES

CROSS REFERENCE TO RELATED APPLICATIONS

This application is a U.S. National Phase filing under 35 U.S.C. § 371 of International Application PCT/AU2013/001457, filed Dec. 12, 2013, and published as WO 2014/089628 on Jun. 19, 2014. PCT/AU2013/001457 claimed benefit of priority from Australian Patent Application No. AU 2012905497, filed Dec. 14, 2012. The entire contents of each of the prior applications are hereby incorporated herein by reference.

FIELD OF THE INVENTION

The present invention relates to close pins, clothes pegs and the like and in particular to a fastener for hanging clothes.

The invention has been developed primarily for use in hanging clothes and will be described hereinafter with reference to this application. However, it will be appreciated that the invention is not limited to this particular field of use.

BACKGROUND

According to existing arrangements, clothes pegs, close pins and the like are employed for the purposes of fastening items of clothing to a clothesline. However, existing fastening arrangements suffer from several disadvantages including clothing items becoming dislodged, especially where the clothing items have increased a mass on account of wetness. Furthermore, existing arrangements require actuation (i.e. the physical manipulation of the clothes peg to open the clothes peg) prior to fastening.

The present invention seeks to provide a fastener for hanging clothes, which will overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY

According to one aspect, there is provided a fastener for hanging clothes, the fastener comprising a lifting hook adapted for lifting in use.

Preferably, the fastener further comprises a further lifting hook adapted for lifting in use.

Preferably, the lifting hook and further lifting hook are oppositely located.

Preferably, the lifting hook and further lifting hook are outwardly located.

Preferably, the lifting hook and the further lifting hook are inwardly located.

Preferably, the lifting hook is shaped to define a latch.

Preferably, the latch is shaped to define a guide.

Preferably, the fastener further comprises a clothesline engagement adapted for engaging a clothesline in use and wherein the clothesline engagement and the lifting hook are respectively located such that the fastener assumes a first substantially vertical orientation in use.

Preferably, the clothesline engagement is located such that the fastener assumes a second substantially vertical orientation substantially opposite the first substantially vertical orientation in rest.

Preferably, the fastener further comprises opposing levers each acting at a fulcrum and wherein the lifting hook is located at a surface of the opposing levers.

Preferably, the surface is an outer surface.

Preferably, the fulcrum comprises a flexure bearing.

Preferably, the fastener further comprises a biasing means adapted for biasing the levers in a closed configuration.

Preferably, the biasing means comprises a flat spring.

Preferably, the biasing means comprises a coil spring.

Preferably, the opposing levers define securements for securing the flat spring.

Preferably, the fastener further comprises grips.

Preferably, the fastener further comprises cooperating clothes engagements located at a fastener end of the fastener and between the levers.

Preferably, the clothes engagements are shaped to define an aperture.

Other aspects of the invention are also disclosed.

BRIEF DESCRIPTION OF THE DRAWINGS

Notwithstanding any other forms which may fall within the scope of the present invention, a preferred embodiments of the invention will now be described, by way of example only, with reference to the accompanying drawings in which.

DESCRIPTION OF EMBODIMENTS

Figure 1:
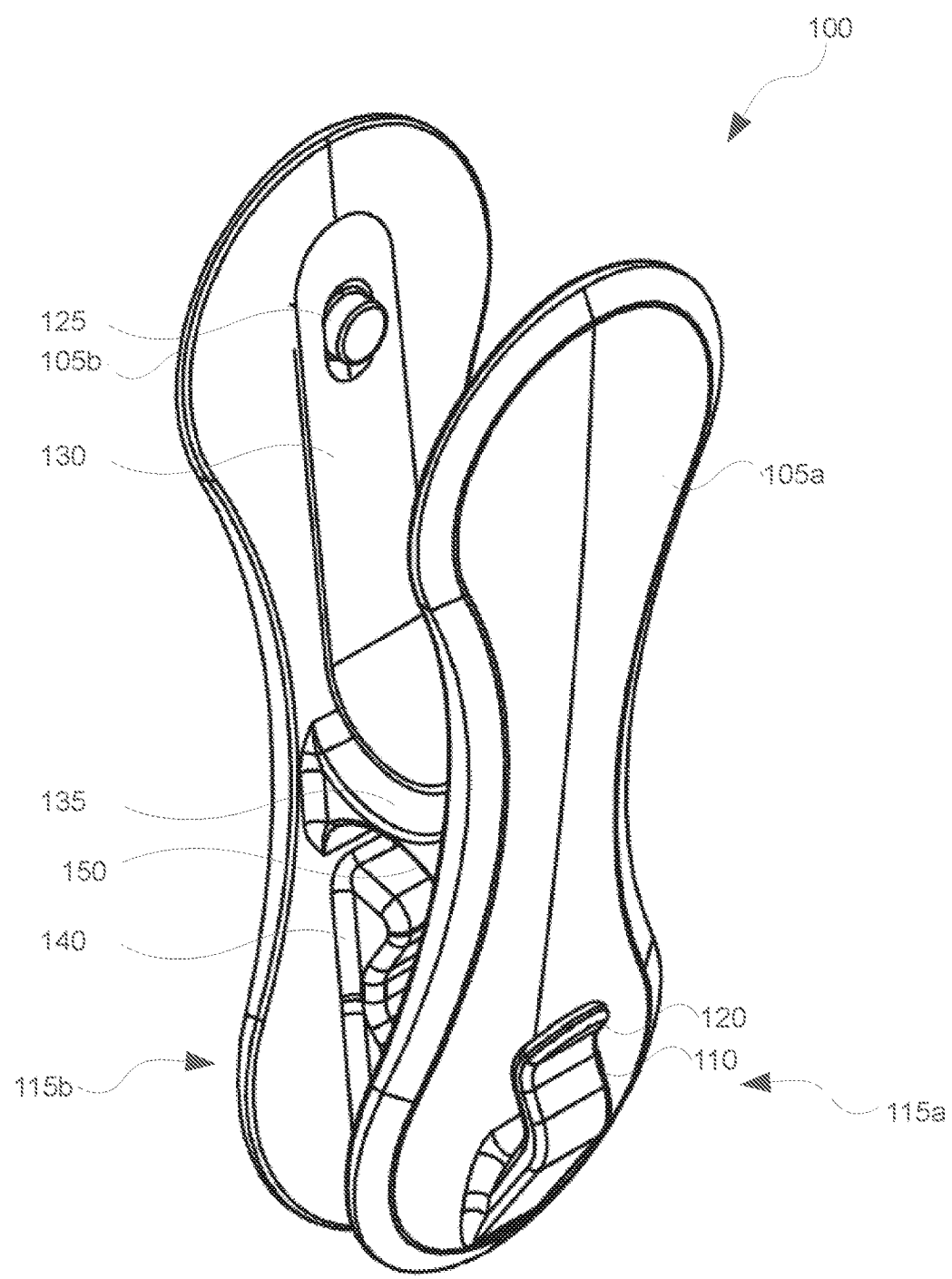
FIG. 1 shows a perspective view of a fastener for hanging clothes in accordance with a preferred embodiment of the present invention.

It should be noted in the following description that like or the same reference numerals in different embodiments denote the same or similar features.

Referring to the accompanying figures, there is shown embodiments of a fastener 100 for hanging clothes. In preferred embodiment, the fastener 100 is manufactured from plastic and further preferably a durable plastic adapted for withstanding degradation from prolonged exposure to sunlight, temperature fluctuations and the like. The fastener 100 is preferably adapted for hanging on a clothesline or the like but it should be appreciated that the fastener 100 need not necessarily be limited to this application and may be adapted for fastening to other objects for the purposes of hanging clothes. Similarly, the fastener 100 should not be construed as being limited for hanging clothes and may be adapted for hanging other items as the case may be.

The faster 100 comprises a lifting hook 115 adapted for lifting in use. In this manner, the fastener 100 advantageously addresses the problem of clothes becoming dislodged and falling to the ground, especially when a clothes item has additional weight from saturation. Specifically, the user is able to use the lifting hook 115 to secure an item of clothing and a simple and efficient manner which substantially reduces the possibility of the clothes item becoming dislodged during use. For example, trousers, bras, underwear and the like comprise straps which may be suitably inserted into the hook 105 for engagement. Furthermore, a plurality of fasteners 100 may be spaced apart the clothesline so as to engage the item of clothing at different points to distribute weight bearing.

Furthermore, the hook 115 need not necessarily be limited to engaging clothing straps and the like and may be adapted for engaging other portions of a garment. For example, an edge of a T-shirt may be engaged by the hook 115.

In certain embodiments, the Hook 115 may be adapted for engaging other fasteners 100 so as to allow the daisy chaining of fasteners 100. Even further, the fasteners 100 in this embodiment may comprise apertures or other engagements for engaging the hooks of adjacent fasteners 100.

In a preferred embodiment, the fastener 100 comprises two hooks 115a and 115b. In this manner, the fastener 100 may be adapted for hooking two separate items or advantageously presenting an accessible hook 115 facing the user no matter the way in which the fastener 100 engages the clothesline.

Furthermore, the hooks 115 are outwardly located for ease of access during use. In this manner, the fastener 100 may engage an item of clothing in a conventional manner and simultaneously engage the same or another item of clothing using the hooks 115. It should be noted that in one embodiment of the hooks 115 need not be outwardly located and may be inwardly located. In this inwardly located configuration, the hooks 115 may yet serve their purpose for hooking yet present a fastener 100 without protrusions which may cause entanglement and the like.

Figure 2:
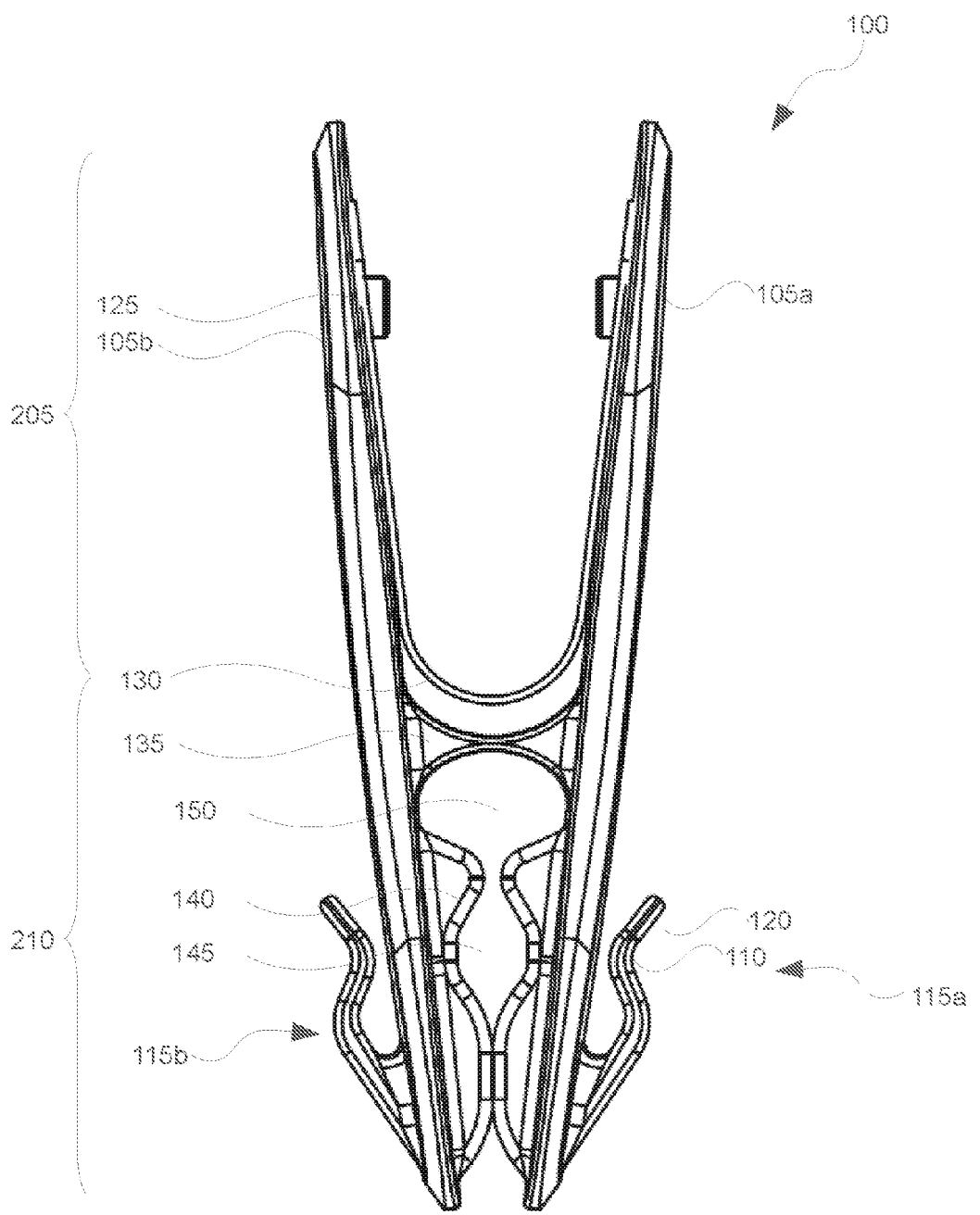
FIG. 2 shows an elevation view of the fastener of FIG. 1 in accordance with another embodiment of the present invention.
Figure 3:
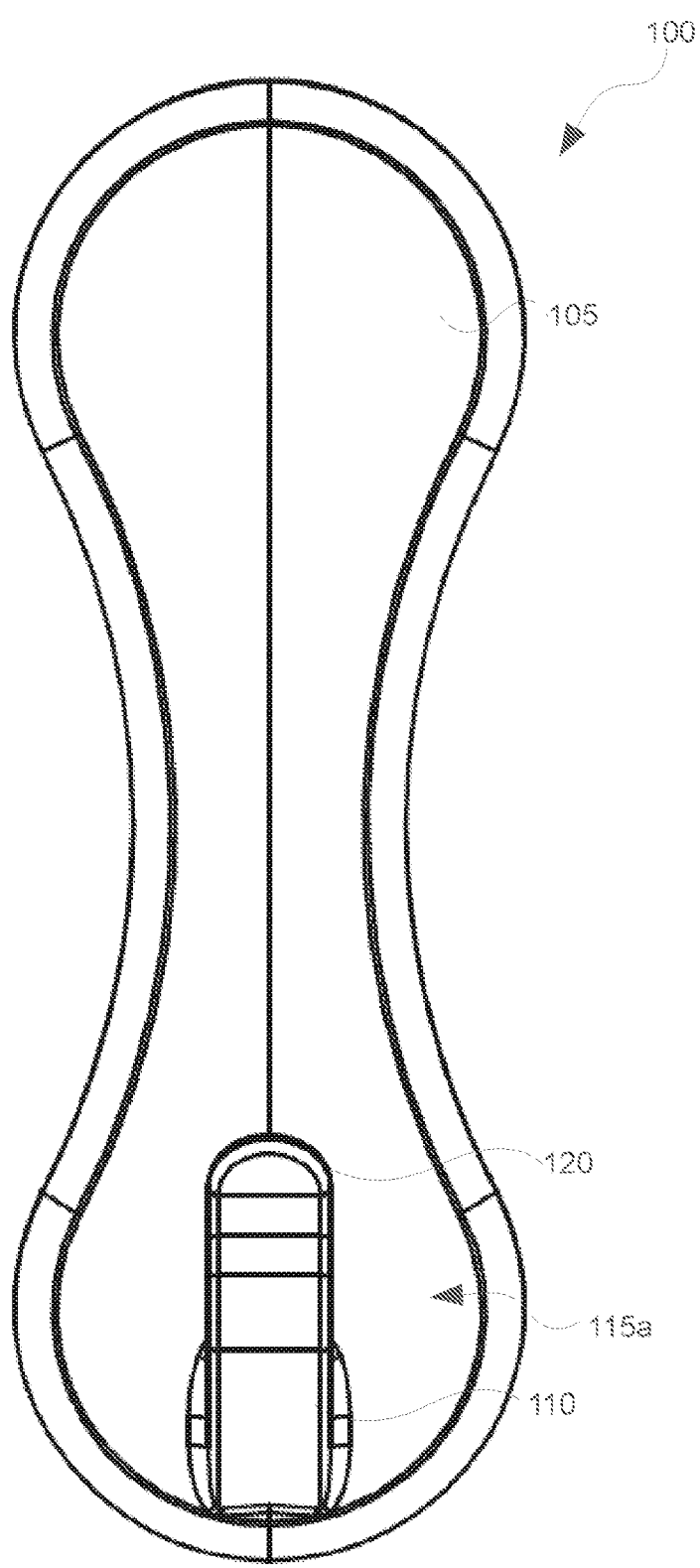
FIG. 3 shows a further elevation view of the fastener of FIG. 1 in accordance with another embodiment of the present invention.
Figure 4:
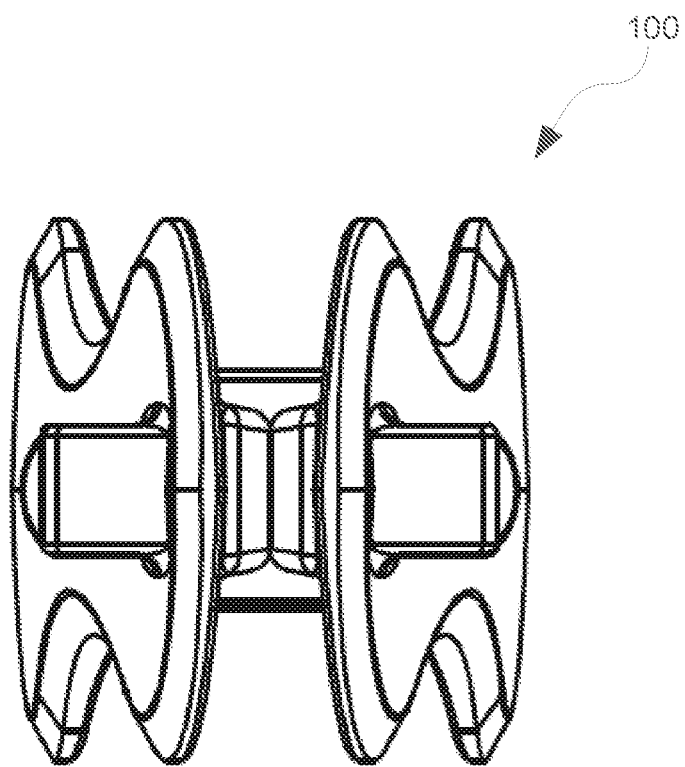
FIG. 4 shows a bottom view of the fastener of FIG. 1 in accordance with another embodiment of the present invention.

Referring now to FIG. 2, it is apparent that the hook 115 defines a latch so as to advantageously substantially reduce the possibility of an item of clothing becoming dislodged during use. The hook 115 is preferably pliable such that during engagement, the hook 105 is adapted to bend outward to accommodate the incoming or outgoing item of clothing. Yet further, the hook 115 preferably comprises a guide 120 for guiding items of clothing into the hook 115 for securement by the latch 110. The guide 120 is outwardly orientated so as to engage and direct an item of clothing during engagement.

Figure 5:
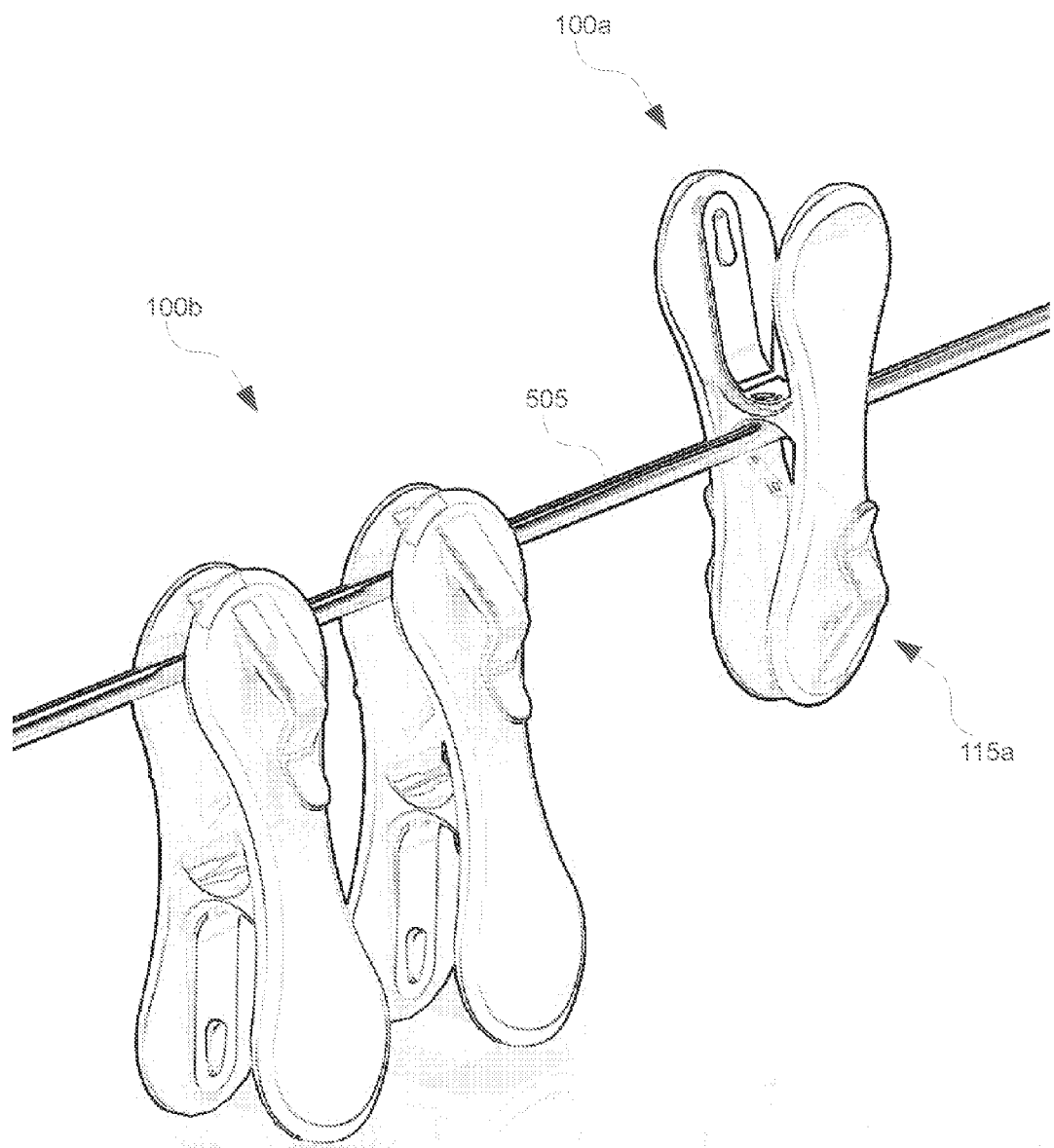
FIG. 5 shows the fastener of FIG. 1 in situ in accordance with another embodiment of the present invention.

The fastener 100 comprises a clothesline engagement 150 for engaging a clothesline or other similar item. The hooks 115 are located such that in use, the fastener 100 is orientated in a first substantially vertical orientation. Also, the clothesline engagement 150 is located such that when not in use, the fastener 100 comes to rest in an opposite substantially vertical orientation. Specifically, referring to FIG. 5, there is shown to orientations of the fastener 100 comprising a first orientation 100b where the fastener 100 is at rest. As will be described in further detail below, the fastener 100 comprises clothes engagements 140 shaped to define an aperture, which, in the embodiment presented, is adapted for engaging the clothesline 505. Furthermore, in FIG. 5, there is shown the fastener 100 in the second orientation 100a, being the orientation of the fastener 100 takes when an item is hooked within the hook 115.

The fastener 100 comprises opposing levers 105 having a first lever 105a and a second lever 105b acting on fulcrum 135. In this manner, pressure applied to the levers at the handling end 205 causes the fastener 100 to take on an open configuration.

In a preferred embodiment, the fulcrum 135 comprises a flexure bearing so as to allow the fastener 100 to be manufactured as a non-composite item. Of course, it should be appreciated that the fulcrum 135 may employ other mechanical arrangements allowing the levers 105 to leverage with respect to each other.

The fastener 100 comprises biasing means 130 for biasing the levers 105 in a closed configuration. The embodiment given in FIG. 2 shows the faster 100 in the closed configuration. The biasing means 130 may comprise a spring such as a coil spring or the like. However, in the preferred embodiment shown, the biasing means comprises a flat spring accommodated between the levers 105. Referring to FIG. 1, the flat spring comprises edgewise apertures for receiving securements 125 therein for securing the flat spring in place.

In certain embodiments, the handling end 205 comprises grips 605 for assisting the user in gripping the fastener 100.

Referring again to FIG. 2, the fastener 100 comprises clothes engagements 140 located at a fastening end 210 of the fastener 100. The clothes engagements 140 define surfaces adapted for enhancing the securement of clothes, and other items. Specifically, the clothes engagements 140 shaped to define an aperture 145 therebetween adapted for accommodating portions of an item of clothing, or the clothesline where the fastener 100 is in the resting configuration as described above. Furthermore, the clothes engagements 140 curved so as to allow the sliding inwards and outwards of clothes items, clothing lines and the like.

Alternative Embodiments

Alternative embodiments are provided in FIGS. Is 6, 7 and 8. As is apparent from the different embodiments presented, the embodiments retain the feature of the hook 115.

Figure 6:
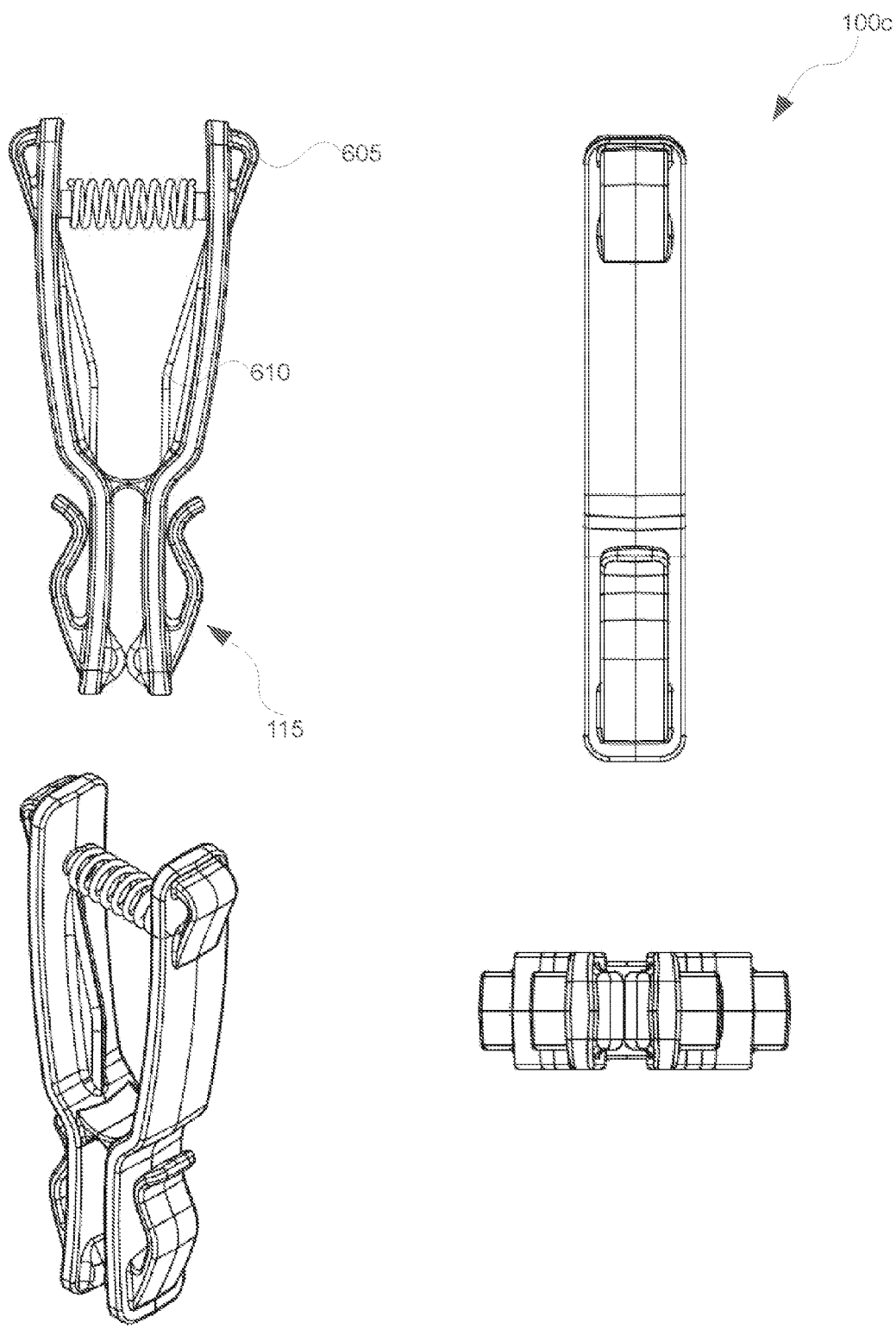
FIG. 6 shows a fastener in accordance with another embodiment of the present invention.
Figure 7:
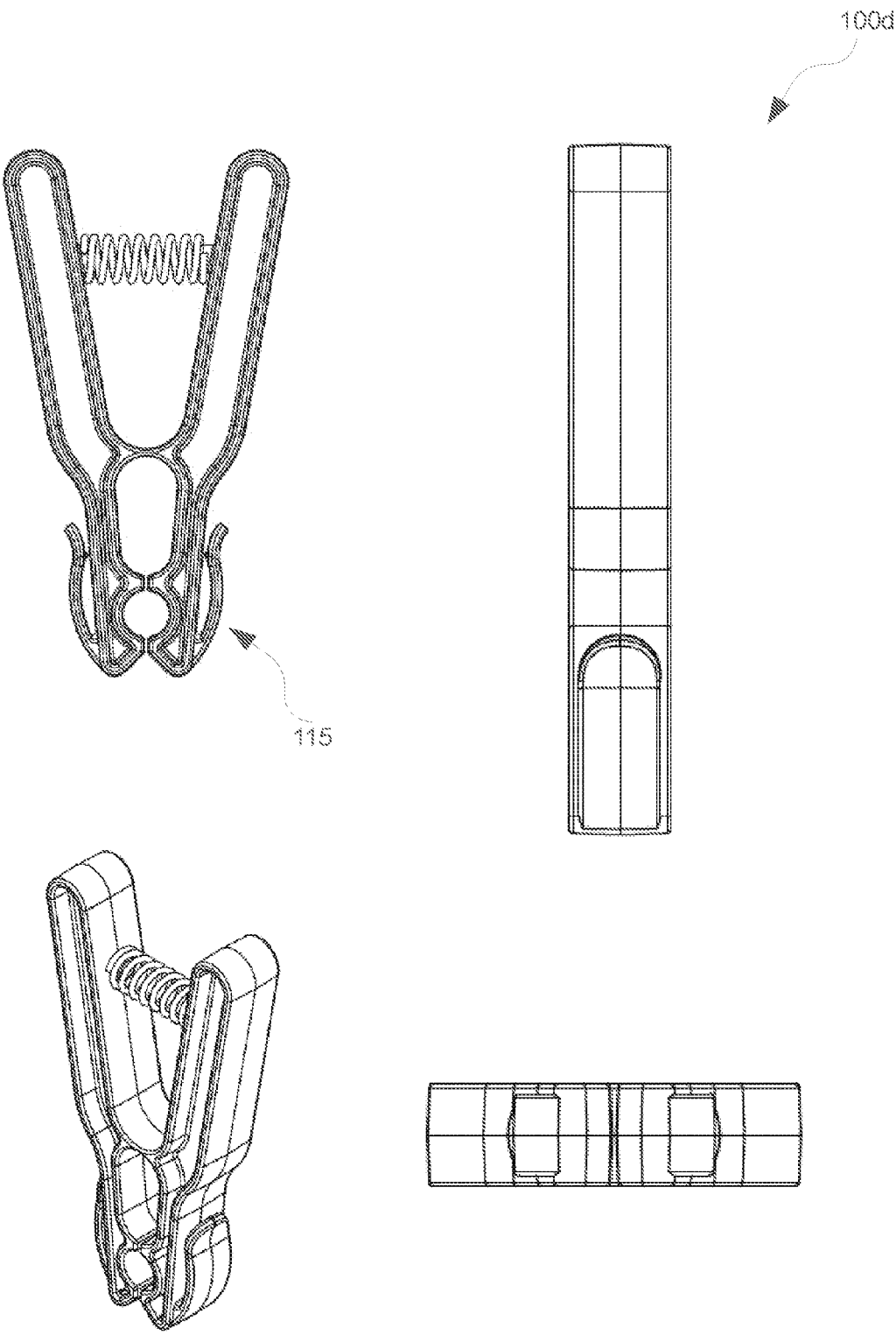
FIG. 7 shows a fastener in accordance with another embodiment of the present invention.
Figure 8:
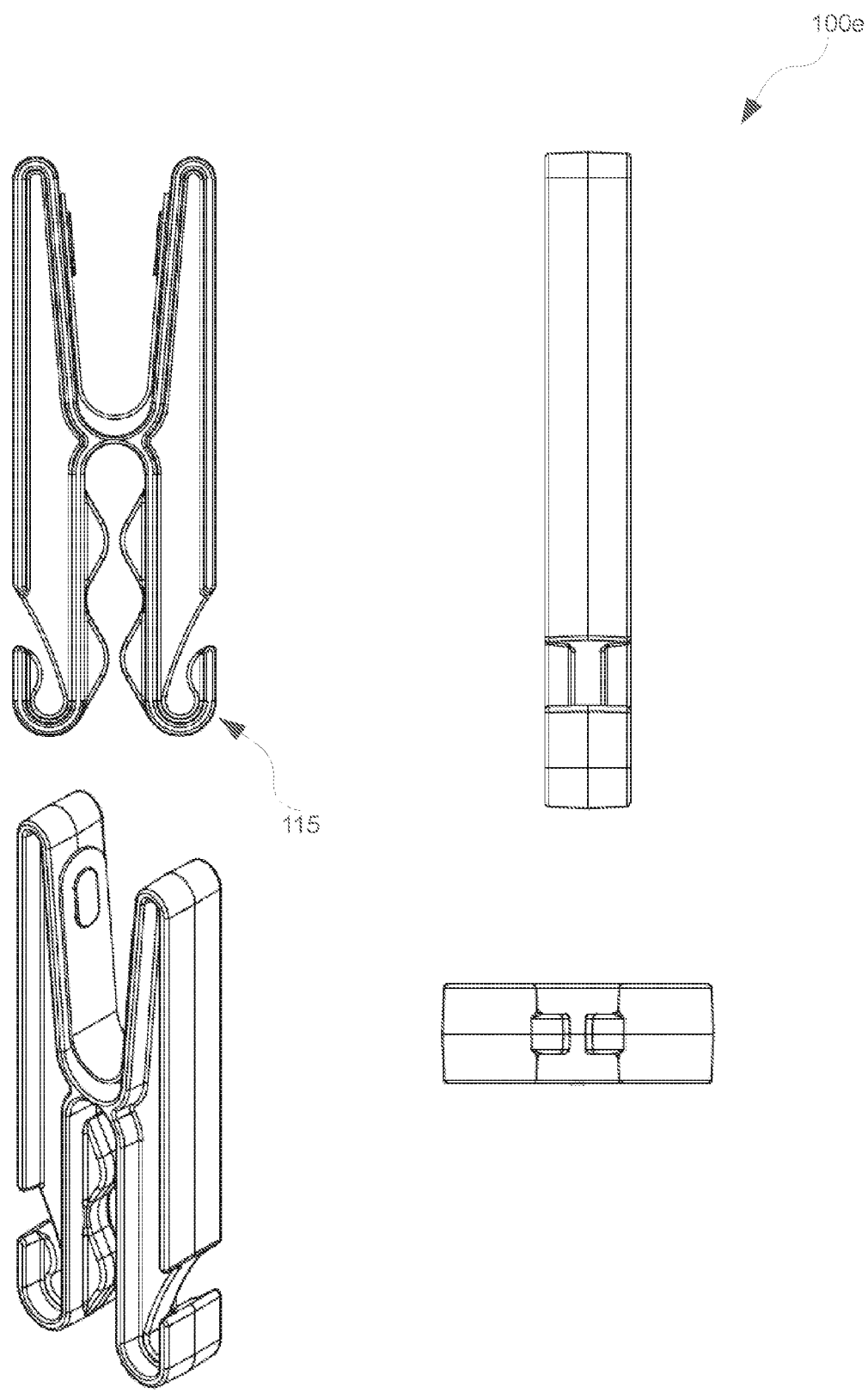
FIG. 8 a fastener in accordance with another embodiment of the present invention.

Embodiment 100c as substantially shown in FIG. 6 provides a fastener 100 having generally elongated dimensions. Furthermore, the fastener 100c comprises a coil spring biasing means between the levers. The fastener 100c comprises reinforcing members 610 adapted for reinforcing the levers.

Embodiment 100d provides reinforced levers 105 handling end 205. The fastener 100d similarly comprises a coil spring biasing means.

Embodiment 100e comprises straight-line parameters and recessed hooks 115. The fastener 100e similarly comprises a flat spring biasing means.

INTERPRETATION

Embodiments

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Different Instances of Objects

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Specific Details

In the description provided herein, numerous specific details are set forth. However, it is understood that embodiments of the invention may be practiced without these specific details.

In other instances, well-known methods, structures and techniques have not been shown in detail in order not to obscure an understanding of this description.

Terminology

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

Comprising and Including

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

Scope of Invention

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

INDUSTRIAL APPLICABILITY

It is apparent from the above, that the arrangements described are applicable to the clothesline accessory industries.

The invention claimed is:

1. A fastener for hanging clothes, the fastener comprising a fastening end and a handling end;
   said fastening end comprising a clothesline engagement adapted for engaging a clothesline in use;
   a first lifting hook and a second lifting hook oppositely located at the fastening end, the first lifting hook and the second lifting hook being adapted to secure an item of clothing in use: and
   opposing levers each acting at a fulcrum, wherein each of the first lifting hook and the second lifting hook is located at a surface of the opposing levers.

2. A fastener as claimed in claim 1, wherein the first lifting hook and the second lifting hook are outwardly located.

3. A fastener as claimed in claim 1, wherein the first lifting hook and the second lifting hook are inwardly located.

4. A fastener as claimed in claim 1, wherein each of the first lifting hook and the second lifting hook is shaped to define a latch.

5. A fastener as claimed in claim 4, wherein the latch is shaped to define a guide.

6. A fastener as claimed in claim 1, wherein the clothesline engagement and each of the first lifting hook and the second lifting hook are respectively located such that the fastener assumes a first substantially vertical orientation in use.

7. A fastener as claimed in claim 6, wherein the clothesline engagement is located such that the fastener assumes a second substantially vertical orientation substantially opposite the first substantially vertical orientation in rest.

8. A fastener as claimed in claim 1, wherein the surface is an outer surface.

9. A fastener as claimed in claim 1, wherein the fulcrum comprises a flexure bearing.

10. A fastener as claimed in claim 1, further comprising a biasing means adapted for biasing the levers in a closed configuration.

11. A fastener as claimed in claim 10, wherein the biasing means comprises a flat spring.

12. A fastener as claimed in claim 11, wherein the opposing levers define securements for securing the flat spring.

13. A fastener as claimed in claim 10, wherein the biasing means comprises a coil spring.

14. A fastener as claimed in claim 1, further comprising grips.

15. A fastener as claimed in claim 1, further comprising cooperating clothes engagements located at the fastening end of the fastener and between the levers.

16. A fastener as claimed in claim 15, wherein the clothes engagements are shaped to define an aperture.

* * * * *